INVENTOR.
THOMAS G. MARSHALL, JR.
BY
Eugene M. Whitacre
ATTORNEY

INVENTOR.
THOMAS G. MARSHALL, JR.
BY Eugene M. Whitacre
ATTORNEY

July 6, 1965 T. G. MARSHALL, JR 3,193,770

VOLTAGE AND PHASE MEMORY SYSTEM

Filed May 3, 1961 5 Sheets-Sheet 3

INVENTOR.
THOMAS G. MARSHALL, JR
BY Eugene M. Whitacre
ATTORNEY

INVENTOR.
THOMAS G. MARSHALL, JR.
BY
Eugene M. Whitacre
ATTORNEY

July 6, 1965 T. G. MARSHALL, JR 3,193,770

VOLTAGE AND PHASE MEMORY SYSTEM

Filed May 3, 1961 5 Sheets-Sheet 5

INVENTOR.
THOMAS G. MARSHALL, JR.
BY
Eugene M. Whitacre
ATTORNEY

United States Patent Office 3,193,770
Patented July 6, 1965

3,193,770
VOLTAGE AND PHASE MEMORY SYSTEM
Thomas G. Marshall, Jr., Skillman, N.J., assignor to Radio Corporation of America, a corporation of Delaware
Filed May 3, 1961, Ser. No. 107,541
8 Claims. (Cl. 328—155)

The present invention relates to electrical voltage-memory systems, and has for an object to provide an improved voltage-memory system with frequency-division phase-memory elements.

Some work has already been done relevant to phase-memory elements with frequency-division pulse circuits such, for example, as a phase-bistable circuit described in the Proceedings of the IRE for September 1953, in an article by R. H. Baker titled "The Phase Bistable Transistor Circuit." This is a monostable transistor circuit designed to give two stable phases. The use of non-linear reactance devices to give a plurality of stable phases has also been proposed, as described in the Proceedings of the IRE for April 1959, in an article by R. L. Wigington titled "A New Concept in Computing." The latter circuit is of interest in high speed computers, and both circuits are primarily adapted to perform computer logic operations.

While the principle of obtaining stable phase states by frequency division is employed in the memory system of the present invention, the different method of implementation and means provided lead to many practical advantages for voltage memory circuits.

Voltage memory circuits having various other principles of operation have also been devised such, for example, as described in an article by R. A. Henle in the "AIEE Transactions on Communications and Electronics" for November 1955, titled "A Multistable Transistor Circuit," and an article by R. Nuiz in the "IRE Transactions on Broadcast and TV Receivers" for January 1959, titled "Television Wireless Remote Control."

While a wide variety of voltage memory circuits and devices have been developed, most involve some practical disadvantages, such as requiring the use of many non-linear elements or the use of many costly elements to give long time storage. It is desirable that developments in this field include circuit simplification and cost reduction as well as adaptation to different uses.

It is therefore a further object of this invention to provide an improved, simplified and economical voltage memory system which is adapted for a plurality of different uses.

It is also a further object of this invention to provide an improved voltage memory circuit having a quantized output voltage which, during a control period, follows an input control voltage or signal to any of a relatively large number of discrete levels where the output voltage remains unchanged for any length of time, until a new control period is initiated.

It is also an object of this invention to provide an improved and simplified voltage memory unit having many stable operating states and utilizing only conventional devices, such as transistors and diodes, and which is particularly adapted for radio and TV receiver remote-control applications and the like.

It is a still further and important object of this invention to provide an improved frequency-division voltage-memory system which employs relatively economical circuitry and yields a relatively large number of stable voltage levels for a relatively small number of active signal translating and non-linear devices.

In a voltage memory system in accordance with the invention, having only a single-stage of frequency-division, a large number of stable voltage output levels are found to be attainable and practical. Each phase memory in such a system may include only one transistor and two diodes. Thus relatively few active and non-linear elements are required. A memory unit of this type is also adapted for direct storage of phase and timing information, for use in counter circuits, and as a voltage quantizer. A complete system is thus relatively simple and economical to build.

In a complete frequency-division voltage-memory system in accordance with the invention, a set of input terminals is provided for each memory unit or channel. During a control period, the applied control signal or input voltage causes a like voltage at the nearest stable level to appear at a pair of output terminals. The output voltage remains at this level after the control period and until a new control period is initiated. The period of control is determined by an activating signal in some cases or alternatively, by switch means in the input voltage supply connection.

Further in accordance with the invention, a phase-locked blocking oscillator, hereafter called the controlled oscillator, is locked to a synchronizing signal or pulse from a high-frequency blocking oscillator or other suitable source. The controlled oscillator frequency is a submultiple of the synchronizing signal or pulse and preferably relatively widely separated therefrom to provide many stable states.

The stored information in the memory is thus phase difference rather than voltage. An output voltage is derived which corresponds to the phase difference of the memory.

Phase locking is determined by the input voltage or control signal. A phase detector provides a D.-C. output voltage or signal output proportional to the selected phase, that is, proportional to the phase difference between the controlled oscillator and a reference oscillator likewise synchronized by the high-frequency oscillator or source. The higher the frequency-division ratio thus provided, the larger the number of the discrete levels obtainable from the system, making the quantized output voltage a good approximation of a continuously variable voltage in accordance with voltage variations of the control signal or input voltage.

Each controlled oscillator may be synchronized to any of the high frequency pulses, thus permitting it to have any one of many stable phases or phase differences, such as twenty for example, with respect to the reference oscillator, whose phase is not varied. These oscillators constitute the memory portion of the system. Two oscillators, each having one transistor or active element, are in common with all of the memories. These oscillators are the high-frequency oscillator and the phase-reference oscillator.

In addition to its use as the system output voltage, the phase-detector output voltage is fed back to a phase selector or comparator circuit in a second or controlling portion of this system. This requires a phase detector of the type that responds rapidly to changes in phase. This may require two transistors and one diode in a phase detector of the well known multi-vibrator peak-detector type, such, for example, as described in "Wave Forms," MIT Radiation Labs Series, page 533 by B. Chance et al.

During the control period, the output voltage from the phase detector is fed back and compared to the input voltage in the comparator circuit which provides an output control current or signal until the output voltage is at a correct level, generally closely approximating the input voltage. The comparator output current or signal is applied to the controlled oscillator and causes the phase of the controlled oscillator to change with respect to the fixed phase of the reference oscillator until the output voltage is at the discrete level closest to the input voltage. When this occurs, the comparator no longer produces an output signal or current and the phase difference and the output voltage do not change thereafter.

A voltage memory system of the frequency-division type in accordance with the invention is adapted for many uses. However radio and television system remote control circuits are examples of the present use and application of the invention. It has application wherever a voltage memory with a quantized voltage output may be acceptable or desirable.

In addition to a large number of stable voltage levels per active and per non-linear circuit element, the voltage memory system of the present invention provides further advantages and features that may briefly be referred to. In the system of the present invention only conventional devices are used. The speed of operation is limited only by the switching time of the active devices such as transistors and diodes, thus permitting very fast operation. Due to the frequency-division operation, the different output voltage levels are inherently spaced very accurately at equal intervals. This is because the spacing is essentially determined by the location, in time, of the high-frequency synchronizing pulses, as these determine the location of the controlled-oscillator and phase-reference pulses. Finally, the system has no preference as to voltage level and is equally stable at all levels. This follows from the fact that all phase states are identical and hence equally probable.

The invention, together with other objects and advantages, will further be understood from the following description when considered with reference with the accompanying drawings, and its scope is pointed out in the appended claims.

In the drawing, FIGURE 1 is a block diagram of the circuit of a multi-unit voltage memory system embodying the invention;

Figure 1:
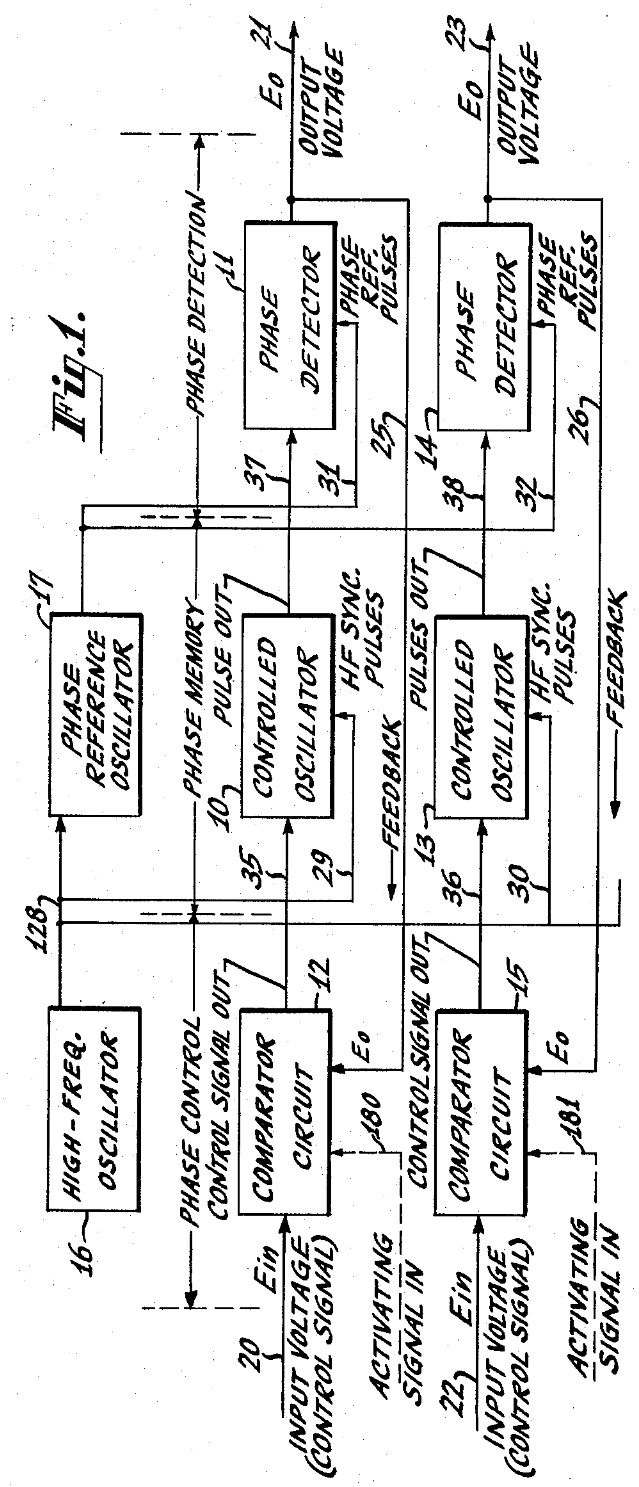

Referring to the drawings, wherein like elements throughout the various figures are designated by like reference characters, and referring particularly to FIGURE 1, the overall voltage-memory system is made up of one or more voltage memory units which are supplied in common with high-frequency timing signals or pulses and lower-frequency fixed reference pulses or signals. In the system shown in FIGURE 1 two memory units are provided, each of which consists of a controlled oscillator, a phase detector and a comparator or phase-control circuit. Thus in the circuit of the present example, a controlled oscillator 10, a phase detector 11 and a comparator circuit 12 constitute one voltage-memory unit of the system, while a controlled oscillator 13, a base detector 14 and a comparator circuit 15 constitute a second voltage-memory unit. As many more such units or channels may be provided as may be desired or required for any particular set of functions to be controlled.

In common with each of the voltage-memory units, as signal or pulse supply sources therefor, are a high-frequency oscillator 16 and a phase-reference oscillator 17. The comparator circuits 12 and 15 constitute the phase-control portion of the system, as indicated by the legend which appears in the drawing above the comparator circuit 12. The controlled oscillators 10 and 13 constitute the phase-memory portion of the system, and the phase detectors 11 and 14 constitute the phase-detection portion of the system, both as indicated by the additional legends associated with the elements referred to, in a similar manner to the phase-control section.

Each memory unit or circuit provides a quantized output voltage $E_o$ which, during a control period, follows an input voltage or control signal $E_{in}$ to any of several discrete levels, and then remains at that level after the control period. In the system shown, the input voltage or control signal to the first voltage-memory unit is applied to the comparator circuit 12 by circuit means or connections as indicated by the arrowed line 20, and the output voltage is derived from the associated phase detector 11 through circuit connections as indicated by the arrowed line 21. Likewise, for the second voltage-memory unit, the input voltage or control signal is applied to the comparator circuit 15 through circuit connections indicated by the arrowed line 22, while the output voltage is derived from the phase detector 14 through circuit connections indicated by the arrowed line 23. Since this is a block diagram of the units and circuit connections therefor in the system, the interconnecting lines between the elements indicate signal or current flow, and are representative of circuits which are shown in detail in FIGURE 7 and described therewith. The overall system is believed to be more effectively represented and to be more readily understood by this simplified diagram.

Further referring to the diagram of FIGURE 1, the output voltage is arranged to be compared to the input voltage or signal in the comparator circuits, and for this purpose the output voltage from the phase detector 11 is fed back to the comparator circuit 12 through a suitable circuit connection indicated by the arrowed line 25. Likewise the arrowed line 26 indicates the feedback circuit connection for applying the output voltage from the phase detector 14 to the comparator circuit 15.

The high-frequency oscillator 16 supplies high-frequency signals or pulses to the phase-reference oscillator 17 and to the controlled oscillators 10 and 13 for synchronizing and timing purposes, through circuit connections indicated by the arrowed lines 28, 29 and 30 respectively. The phase-reference oscillator 17, in turn, supplies phase-reference signals or pulses to the phase detectors 11 and 14 through circuit connections indicated by the arrowed lines 31 and 32 respectively.

In each voltage memory unit the controlled oscillator is a stable, being of the blocking-oscillator type having a frequency ($f_0$) synchronized to every $n$th pulse of the high frequency pulses from the source 16 whose frequency is ($nf_0$). The controlled oscillators 10 and 13 are therefore astable blocking oscillators each having ($n$) possible stable phases or states. The system in accordance with the invention, therefore, includes frequency division in its operation wherein the controlled-oscillator output frequency, that is the frequency of the pulse output therefrom, is that of the high-frequency synchronizing pulses from the high frequency oscillator 16 divided by the factor ($n$).

The pulse signal output, from each of the controlled oscillators 10 and 13, is applied to its corresponding phase detector for comparison with phase-reference pulses or signals derived from the phase-reference oscillator 17. The phase reference oscillator 17 and the controlled oscillators 10 and 13 all operate at the same frequency. The phase of the oscillator 17 remains constant while the phase of each of the controlled oscillators 10 and 13 is constant except during control periods when it is independently varied with respect thereto. This variation is controlled by variation in the control current or signal output from the comparator circuits.

The control current or signal output from the comparator circuit 12 is applied to the controlled oscillator 10 through circuit connections indicated by the arrowed line 35, while a similar output current or signal from the comparator circuit 15 is applied to the controlled oscillator 13 through similar circuit connections indicated by the arrowed line 36. The pulse output signal from the controlled oscillator 10 is applied to the phase detector 11 through circuits indicated by the arrowed line 37, and similarly the pulse output signal from the controlled oscillator 13 is applied to the phase detector 14 through circuits indicated by the arrowed line 38.

Figure 2:
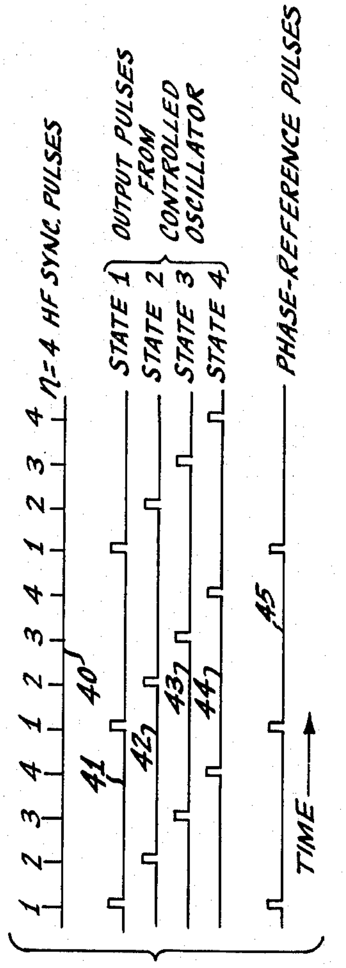
FIGURES 2, 3, 4, 5 and 6 are graphs showing signal pulse and wave forms illustrating certain operating characteristics of the system shown in FIGURE 1, in accordance with the invention.

Referring to FIGURE 2, which illustrates the general principle of operation of the phase memory, the high-frequency sync pulses, the controlled oscillator output pulses, and the phase-reference oscillator output pulses are represented graphically to illustrate their timing relation. In the graph of FIGURE 2, the equal time spacing of the series of high-frequency sync pulses is indicated along a line 40, for the condition where $n=4$. Thus the frequency ($f_0$) of the controlled oscillators would be 5,000 cycles if the frequency ($nf_0$) of the high frequency oscillator 16 were assumed to be 20,000 cycles. The division ratio of four, and the resulting four possible stable states for the controlled oscillator, are selected only by way of example as many more possible stable states may be provided in accordance with the invention, as will be seen. In the present example, therefore, there are four possible stable states as indicated by the output pulses shown along lines 41, 42, 43 and 44 in the graph of FIGURE 2. The corresponding timing relation of the phase-reference pulses are indicated by the pulses shown along the line 45, being in phase with the pulses of the first state of the controlled oscillators.

Referring now to the complete system of FIGURE 1, the phase detectors give an output voltage in each memory unit proportional to the difference in phase between the controlled oscillator pulses, and the reference oscillator pulses which are received through the circuit connections indicated at 31 and 32. During the control period, the output voltage $E_o$ which is fed back is compared to the voltage $E_{in}$ in the comparator which produces an output current or control signal output until the output voltage $E_o$ is at the correct level. The comparator output current or signal causes the phase of the controlled oscillator to change until the output voltage $E_o$ is at the discrete level closest to the input voltage $E_{in}$. When the output voltage is at the level closest to the input voltage there is no comparator output signal, and thereafter the phase state or phase difference, and output voltage, remain fixed and do not change until the input voltage is changed during a subsequent control period.

Summarizing the foregoing considerations, the system of FIGURE 1 shows the use of two voltage memory units with common high-frequency and reference pulse sources. Two separate input voltages or control signals may be applied to provide two separate quantized output voltages which vary in response to variations of the respective input voltages. Additional units may be provided. In this system, the phase reference oscillator and the controlled oscillators may be considered to be blocking oscillators all having the same frequency.

In FIGURE 2, which illustrates the operation of the phase memory, the bottom wave form along the line 45 shows the phase-reference pulses from the phase-reference oscillator 17 in timed relation to any one of the middle wave forms along the lines 41–44 which represent the output pulses available from the controlled oscillators 10 or 13. These are applied to the phase detectors along with the phase-reference pulses and are both synchronized by the high-frequency sync pulses having the timing relation thereto as indicated by the numbered points along the line 40. The frequency division ratio, therefore, is four-to-one in the present example, and the controlled oscillator in each unit may be syncronized to any of the high frequency pulses, thus permitting it to have any of four stable phases or phase differences with respect to the phase-reference oscillator whose phase is not varied.

Figure 3:
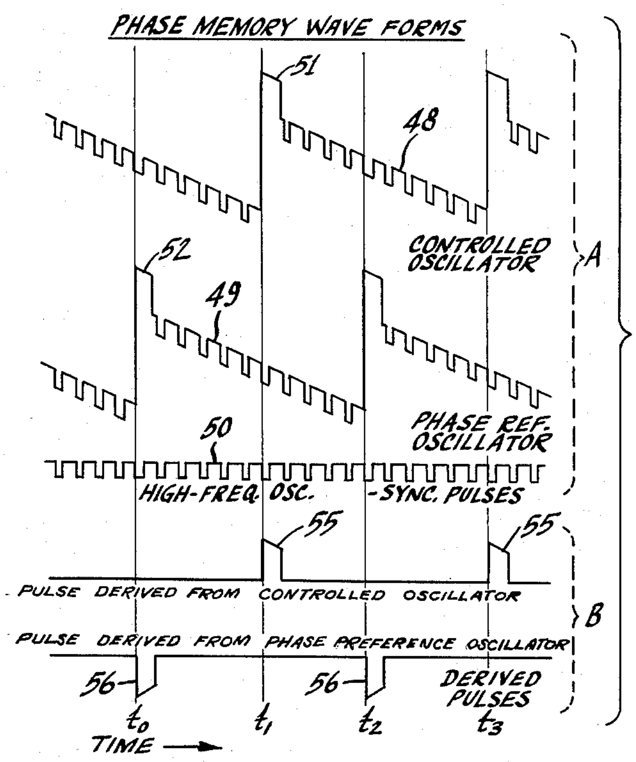
Figure 4:
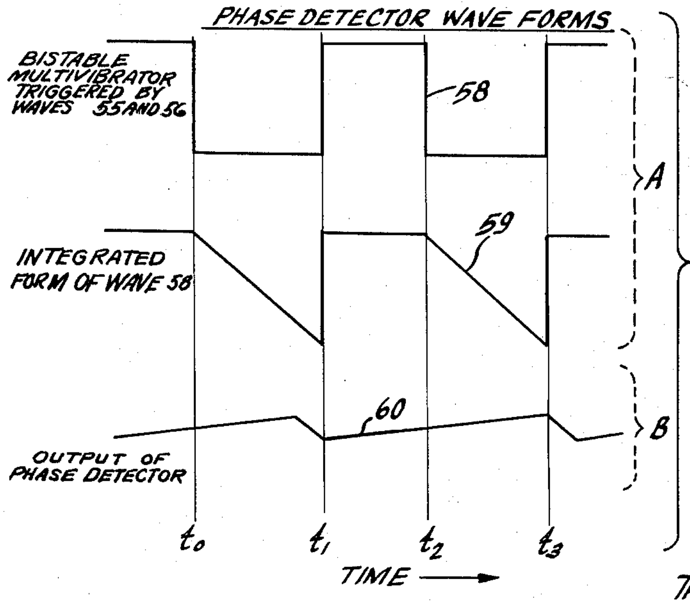

Referring now to FIGURES 3 and 4, along with the preceding figures, oscilloscope wave forms are shown substantially as actually derived from circuit operation, in which the top wave form 48 of FIGURE 3A is of the signal generated by the controlled oscillator 10 and the middle wave form 49 is of the signal generated by the phase-reference oscillator 17. Both oscillators are synchronized by high-frequency signal sync pulses indicated by the wave form 50 at the bottom of FIGURE 3A. It is seen that these latter pulses are also superimposed upon the wave forms 48 and 49. In this case the frequency division ratio is indicated as 11–to–1.

The phase memory portion of the system is substantially complete in itself and may be used in conjunction with a suitable type of control to provide a phase memory or a time-interval memory in which the time interval between the firing of the controlled and reference oscillators, indicated by the pulses 55 and 56, respectively, is, or represents, the stored information. The direct storage of time information may be used in pulse-position modulation systems, for example. However the application for which this system is initially adapted is that of a voltage memory, and the remaining portions of the system of FIGURE 1 in conjunction with the phase memory combine to make such a voltage memory. The phase detectors 11 and 14 give a voltage output $E_o$ proportional to the phase difference between the controlled and phase-reference oscillators, thus providing the desired voltage output. The fact that the signal or output voltage $E_o$ for the system makes it necessary for the phase detector to respond rapidly to changes in phase. It may be considered that the phase detectors are of the multivibrator type, utilizing a peak detector as referred to hereinbefore, or any suitable conventional type.

In FIGURE 3B are shown signal pulses 55 and 56 derived from the controlled and phase reference oscillators respectively, and these are applied, for example, to the phase detector 11 through the circuit connections indicated at 37 and 31, respectively, in the system of FIGURE 1. The resulting wave forms from the detector 11 are shown in FIGURE 4A, in which the top wave form 58 is that of a bistable multivibrator triggered by the pulses 55 and 56 of FIGURE 3B. An integrator incorporated in the phase detector may provide the output voltage having a wave form 59, also as shown in FIGURE 4A.

The width of the top wave form 58 and the depth or height of the wave form 59 are directly proportional to the phase of the controlled oscillator with respect to the phase-reference oscillator 17, in other words, the phase of the pulses 55 with respect to the pulses 56 of FIGURE 3B. The output voltage $E_o$, having a wave form 60, as shown in FIGURE 4B, is that of a peak detector which detects the height of the saw-tooth wave 59 of FIGURE 4A, thus giving an output voltage proportional to the phase of the controlled oscillator, that is, the phase difference between the pulses 55 and 56 of FIGURE 3B, in the present example. The indicated ripple in this wave form is characteristic of peak detectors.

Figure 6:
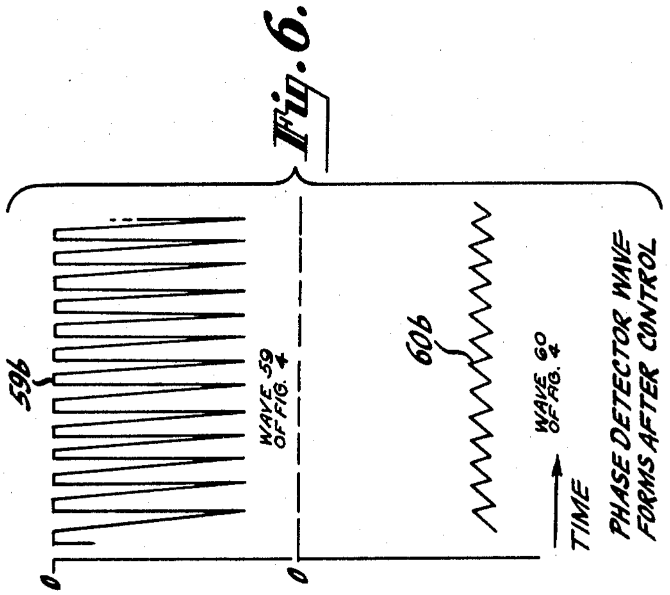
Figure 5:
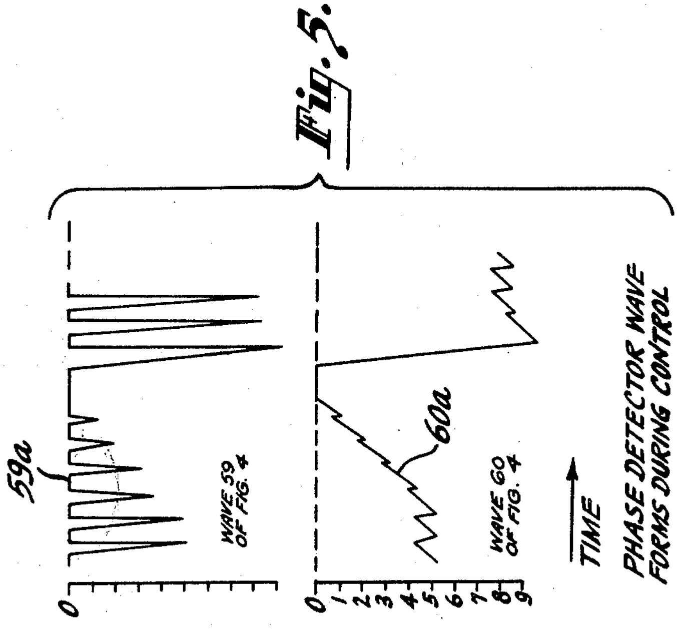

The operation of the remaining portion of FIGURE 1, which is the comparator circuit or phase control portion, may be considered with reference to FIGURES 5 and 6 to which attention is now directed along with the preceding figures. During the control period, a comparison of the output and input voltages is made in the comparator circuit and if the error is greater than a predetermined threshold voltage, a signal or control current is sent to the controlled oscillator which changes its period of oscillation, in the present example, to $^{10}/_{11}$ of its previous value. The phase difference between the controlled oscillator and the phase-reference oscillator will thus be reduced by one increment per cycle of the controlled oscillator. The saw-tooth wave form 59 of FIGURE 4A will thus be reduced in size one increment per cycle.

The resultant decreasing saw-tooth waveform 59*a* is shown in FIGURE 5, and is the wave form 59 of FIGURE 4 but drawn to a compressed time scale, that is, with shorter time units per unit length. Likewise the bottom wave form 60a is the peak-detector or output-voltage wave form 60 of FIGURE 4B drawn to the smaller or shorter time scale as above referred to, and is seen to decrease in accordance with the saw-tooth peaks. These waveforms are for the case where the output voltage changes from 5 unit to 8 units.

The corresponding wave forms, as shown in FIGURE 6 at 59b and 60b, result after the control period. The output voltage will remain at the new level until a subsequent control period. The phase-detector wave forms shown in FIGURE 5 are those during control of the output voltage by an input voltage, and the wave forms shown in FIGURE 6 are those after control. A comparison of the wave forms 59b and 60b of FIGURE 6 will indicate that the shorter or compressed time scale is the only difference between them and 59 and 60 of FIGURE 4, since both are for the quiescent or static condition of operation for the system.

For phase detectors having a peak detector, it may be noted that the detector may be biased with a relatively constant current so that its response is rapid enough to follow the successively decreasing saw tooth peaks, as shown in FIGURE 5, which is desirable in order that the control circuit may function without hunting. This biasing of the peak detector causes the ripple that appears in the output wave form 60 and 60b in FIGURES 4B and 6 respectively.

It should be noted that there are ten stable levels indicated in FIGURE 5, which shows saw-tooth pulses of zero to nine units high, even though the phase memory has eleven possible stable states. One stable level is made substantially inaccessible by this method because the circuit of the control oscillator is changed to $^{10}/_{11}$ of its normal period during control, and therefore the division ratio is ten, indicating that only ten levels are available during the control period. The loss of one stable level is not a disadvantage as one has only to use a different and higher frequency division ratio of additional stable states are required. An alternate control procedure in which all stable levels are accessible is one in which the phase difference between the controlled oscillator and the phase-reference oscillator is increased one incremental per cycle rather than decreased.

Having considered the overall construction and operation of a frequency-division voltage memory system in accordance with the invention, consideration may now be given to the specific circuitry which is further proposed for the phase-reference and controlled oscillators, and particularly for the phase control or comparator circuits. Accordingly attention is now directed to FIGURE 7 along with FIGURE 1.

Figure 7:
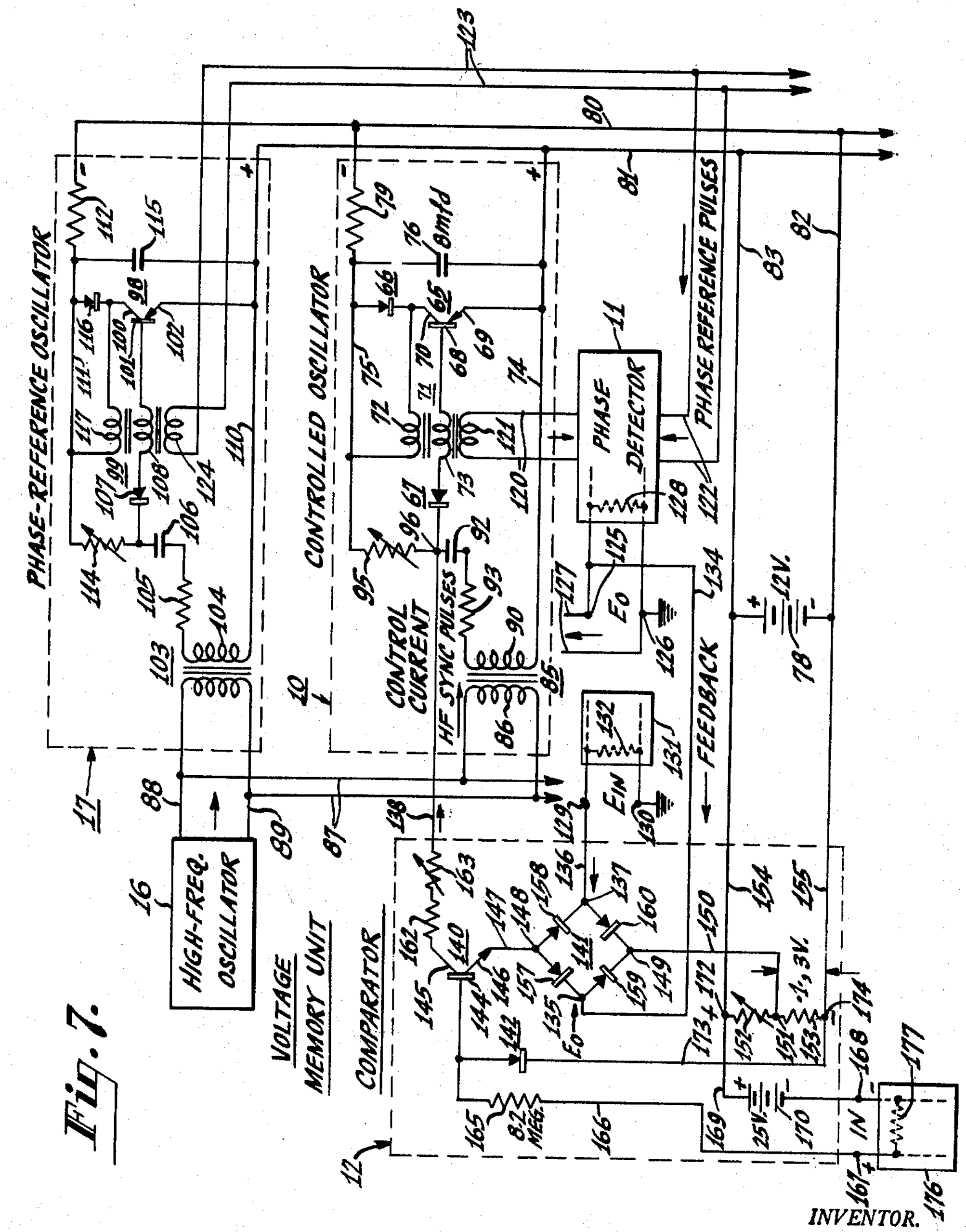
FIGURE 7 is a schematic circuit diagram of one complete unit of the system shown in FIGURE 1, providing a detailed showing of the circuitry thereof in accordance with the invention; and, FIGURE 8 is a block schematic circuit diagram showing one use of the invention in a remote-control system for apparatus such as a television receiver.

In FIGURE 7, the high frequency oscillator 16, together with the phase reference oscillator 17, is shown in connection with the first voltage memory unit of FIGURE 1 comprising the controlled oscillator 10, the phase detector 11 and the comparator circuit 12. The phase detector 11 as hereinbefore indicated may be of any suitable and well known type, such as one having the conventional multi-vibrator and peak detector elements for producing the type of signal output having the several forms shown in FIGURES 4, 5 and 6 in response to a phase differential in the applied pulses. Likewise the high-frequency oscillator 16 represents any suitable source of high-frequency pulses or like signals having a frequency that may be relatively high with respect to the frequency of operation of the oscillators 10 and 17, thereby providing a relatively large frequency-division ratio and a relatively large number of signal output levels.

The circuit of the controlled oscillator 10, and other controlled oscillators in the system, includes, as active elements thereof, a transistor 65 and two diodes 66 and 67. The transistor is of the p-n-p type having a base 68, an emitter 69, and a collector 70. The collector is coupled to the base through suitable feed-back transformer coupling means 71 comprising a primary winding 72 connected in circuit with the collector 70 and coupled with a secondary winding 73 connected in circuit with the base electrode 68. The diode 66 is connected in shunt relation with the primary winding 72 and may be of the type known commercially as a 1N34A. This diode limits the "kickback" voltage of the transformer caused by rapid transistor turnoff. The feedback arrangement provides for the generation of oscillations in a common emitter circuit in which the emitter 69 is connected to a common low potential circuit conductor 74. The collector is connected through the primary winding 72 to a common negative supply conductor 75.

Between the conductors 74 and 75 is connected a filter capacitor 76 and this in turn is connected with a source of operating or biasing potential, comprising a battery 78, through a filter resistor 79 connected with the lead 75 and common negative and positive supply leads 80 and 81 respectively. The later are connected to the biasing or operating potential source 78 through output leads 82 and 83. In this common battery supply circuit the supply leads 80 and 81 may be extended to other elements of the system such as the phase reference oscillator 17, as will be described. The low-potential conductor 74 for the oscillator circuit is thus connected to the positive side of the battery 78 as indicated, and the conductor 75 is connected to the negative side of the battery 78, also as indicated.

For locking the oscillator 10 to the synchronizing or timing pulses from the high-frequency oscillator 16, transformer coupling is also used. For the oscillator 10 this comprises an input transformer 85 having a primary winding 86 connected with a pair of common supply leads 87 which are, in turn, connected to output leads 88 and 89 for the oscillator 16. The secondary 90 of the input transformer 85 is connected between the base 68 and emitter 69, serially through the secondary 73, the diode 67, a capacitor 92, and a resistor 93. The low potential side of the secondary 90 is returned to the low-potential common lead 74. A variable resistor 95 connected with a terminal 96 between the diode 67 and the capacitor 92 is also connected back to the negative supply lead 75 and serves to provide a variable timing circuit for the oscillator in conjunction with the capacitor 92 as described hereinafter. The resistor 93 is a current-limiting resistor effectively connected between the high-frequency oscillator and the controlled oscillator for limiting the flow of current in the base circuit and preventing controlled-oscillator interaction through the common high-frequency oscillator. This may, in the present example, have a resistance of substantially 4.7K ohms. The resistor 95 may have a resistance of 500K ohms and the capacitor 92 may have a capacitance of 3900 micro-micro-farads.

In order that the frequency of the controlled oscillator may be controlled with a small control current as will be described hereinafter, the timing circuit comprising the resistor 95 and the capacitor 92 is of high impedance. The diode 67 may be of the high back-resistance type, known commercially as a T9G, and is poled as shown in a forward direction toward the timing circuit to isolate the timing circuit from high variable emitter and collector saturation currents, so that the operation is fully stabilized. The diode therefore permits control with small currents applied, for example, at the terminal 96 with respect to the low potential conductor 74, without sacrificing stability of the operating frequency and the phase relation of the oscillator to other portions of the system. The resistor 93, as above mentioned, limits the current flow through the synchronizing source and thus eliminates interaction between oscillators or pulse sources.

The phase reference oscillator 17 is perferably, but not necessarily, of similar construction and circuit configuration as the controlled oscillator, since it operates at the same frequency and may then utilize similar circuit elements. Therefore the phase-reference oscillator of the present example includes a transistor oscillator element 98 having feedback transformer coupling 99 between the collector 100 and the base 101, and with the input signal applied between the base 101 and emitter 102 through an input coupling transformer 103 connected with the supply circuit leads 87 from the high frequency oscillator 16.

The base input circuit from the input transformer secondary 104 includes the series current-limiting resistor 105, timing capacitor 106, and isolating diode 107 in series with the feedback coupling transformer secondary winding 108 in the base circuit. The common low potential return lead 110 is connected to the emitter 102 and to the operating or biasing potential supply lead 81. The corresponding negative supply lead 111 for the system is connected through the filter resistor 112 to the negative supply lead 80. The variable resistor 114 in conjunction with the capacitor 106 provides for controlling the circuit operation as described for the oscillator 10. The filter or supply capacitor 115 connected between the leads 110 and 111 provides a stable source of operating voltage for the system. The diode 116 is likewise provided in shunt with the transformer primary winding 117 for voltage limiting.

It may be assumed that the phase reference oscillator and the controlled oscillator 10 of the present example operate at a frequency of 2,000 cycles, for example, while the oscillator 16 may operate at a frequency of 22,000 cycles thus giving ten or more stable states of operation, as described with reference to FIGURE 3, for example. For use in controlling remote apparatus such as a television receiver, as will be referred to hereinafter, fewer stable states may suffice.

It may also be noted that the high-frequency oscillator 16 may be of the same circuit configuration and construction as the phase-reference oscillator and the controlled oscillator, with appropriate circuit values for the components, thus simplifying the problem of supply and manufacture of the overall system by reducing the number of different components required to a minimum, since all oscillators may utilize substantially the same components throughout.

All of the oscillators are of the blocking type or otherwise adapted to provide output pulses at predetermined frequencies. The output pulses or signals from the controlled and phase-reference oscillators are transformer coupled to the phase detector in each channel or voltage memory unit. Thus in the present example, the phase detector 11 is supplied with pulses from the controlled oscillator 10 through supply leads 120 connected with a tertiary winding 121 in the transformer 71 of the controlled oscillator 10. The phase detector likewise receives phase-reference pulses from the phase reference oscillator 17 through supply leads 122 which are connected with output leads 123 from the phase-reference oscillator 17. The output leads 123 are connected with a tertiary or output winding 124 of the transformer 99. It will be noted that these output leads are reversed at the output winding 124 with respect to the output connection of the leads 120 on the output winding 121 of the controlled oscillator for effecting the output pulse relation shown in FIGURE 3B, for the particular phase detectors employed.

It will also be seen that the phase detector ground may not be at the same potential as the positive terminal of the oscillator biasing or operating potential supply source 78, that is, the leads 74 and 110 for example. Therefore transformer coupling from the oscillators to the phase detector simplifies the phase detector design. The phase detector may be a conventional bistable multivibrator which controls a saw-tooth generator which in turn drives a biased peak detector. As these circuits are conventional they are not shown and further description of the phase detector circuits is not deemed necessary. In any case, the phase detector provides a D.-C. output voltage or signal output proportional to the selected phase, that is, proportional to the phase difference between the controlled oscillator and the phase-reference oscillator.

In the present example, the phase detector may be assumed to provide voltage outputs at the output terminals 125 and 126 in one volt steps from zero to 9 volts for example. These terminals are connected to an output circuit 127 leading to any suitable utilization means (not shown) and are connected by a D.-C. path through the phase detector, as represented by the dotted resistor 128. Corresponding input terminals for the system and for the voltage memory unit are provided as indicated at 129 and 130. These are connected with a supply source 131 for the input voltage or control signal which has an internal D.-C. current path as indicated by the dotted resistor 132. This voltage or signal may be made ineffective during noncontrol periods by deactivation of the comparator circuit. The latter is then activated only when it is desired to change the output voltage in accordance with $E_{in}$.

As hereinbefore noted, the complete frequency-division voltage-memory system includes a set of input terminals, such as the terminals 129–130, for each memory unit or channel where a control signal or input voltage may be applied which, during control, causes a like voltage at the nearest stable level to appear at a pair of output terminals, such as the terminals 125–126. The output voltage remains at this level after control, or until a voltage $E_{in}$ of a different level appears, with the comparator circuit activated. In the present example the terminals 126 and 130 are connected to chassis or common ground for the system, as indicated.

The output terminal 125 is also connected through a feedback circuit lead 134 with a bridge input terminal 135 in the comparator circuit 12. The input terminal 129 is similarly connected through a circuit lead 136 with a second and opposite bridge input terminal 137 in the comparator circuit 12. The comparator circuit provides means whereby the input and output voltages may be compared, and in those cases where the difference exceeds a threshold voltage, or slightly greater than ½ volt for example, an output control current or signal is fed to the controlled oscillator through an output circuit lead 138 connected with the control terminal 96 of the controlled oscillator 10.

The comparator circuit in accordance with the invention, includes as active operating elements thereof, a transistor 140, a diode bridge circuit 141 of which two of the terminals 135 and 137 are above referred to, and a diode 142. The transistor 140 comprises a base 144, a collector 145, and an emitter 146, and is of the n-p-n type as indicated, with the emitter connected through a circuit lead 147 with a third or output terminal 148 of the diode bridge circuit 141. The fourth and opposite output terminal 149 of the bridge circuit 141 is connected through a bias supply lead 150 with a tap 151 on a voltage divider resistor comprising two series resistor sections 152 and 153 connected across or between operating potential supply leads 154 and 155, which, in the present example, are connected with the common operating potential supply source 78 for the oscillators.

The bridge circuit 141 includes four diodes of which two diodes 157 and 158 are connected jointly with the output terminal 148 and individually respectively with the input terminals 135 and 137 of the bridge. Likewise between the second output terminal 149 and the input terminals 135 and 137, two diodes 159 and 160 are connected in common with the terminal 149 and individually, respectively, with the terminals 135 and 137, to complete the bridge. It will be noted that the diodes are all poled in a forward or conducting direction from the output terminal 148 to the input terminals 135 and 137, in the case of the diodes 157 and 158. Likewise the diodes 159 and 160 are poled to conduct in a direction from the input terminals 135 and 137 to the output terminal 149. The forward conduction through the bridge, for a transistor of the type shown, is from the emitter to the bias source through the opposed bridge output terminals 148–149.

The input and output voltages $E_{in}$ and $E_o$ for the system are compared across the opposed input terminals 137 and 135 of the bridge, and in those cases where the difference exceeds the threshold, by slightly greater than ½ volt or any predetermined amount, an output current or signal is fed to the control oscillator through the circuit connection 138 for which the return connection or circuit path is through the source 78. Two series collector circuit resistors 162 and 163 are interposed in the control lead 138 between the collector 145 and the control terminal 96 in the control oscillator. The latter terminal is connected through the capacitor 92 and the resistor 93 to the positive supply lead 81 from the source of operating potential. The current magnitude for the control circuit may be adjusted by variation of one of the resistors, such as the resistor 163, as indicated.

It will be noted that the base circuit for the transistor includes a series limiting resistor 165 connected between the base 144 and a connection lead 166 which in turn is connected to an input terminal 167 which is one of a pair for impressing on the comparator an activating signal or voltage. The other input terminal 168 is connected with an input circuit conductor 169 in which is connected a series voltage source such as a battery 170. The input circuit conductor 169 is connected with the positive terminal 172 of the resistor 152 and is thereby connected with the positive side of the supply source 78 through the lead 154. The base 144 is also connected with the negative terminal of the operating voltage or biasing source 78 through the diode 142 and connection leads 173 and 155, the latter being connected between the negative terminal 174 of the resistor 153 and the source 78.

An activating direct-current signal source 176 may be connected between the terminals 167 and 168, thereby connecting the terminals through the internal conductive circuit paths represented by the dotted resistor 177. The battery polarizing source 170 is poled, as indicated, with a positive terminal thereof connected with the terminal 172, thus being in the same polarity relation thereto as the source or battery 78. This battery provides substantially 25 volts, as indicated, to hold the comparator circuit inactive between control periods by biasing the transistor 140 to the nonconducting state. The presence or use of an activating signal for the comparator circuit to control the operation is indicated in the overall system shown in FIGURE 1 by the dotted arrow lines 180 and 181. In the case of the comparator circuit 12, the activating signal indicated at 180 in FIGURE 1 is provided by the source 176 in the complete circuit of FIGURE 7.

The principle of operation of the activating portion is that in the absence of an activating signal from the source 176 (zero D.-C. voltage between the terminals 167 and 168) the 25 volt battery prevents the transistor 140 from conducting so there can be no control action. However, when it is desired to control the memory in accordance with the voltage $E_{in}$ present at terminals 129 and 130, as from the source 131, the activating voltage from the activating signal source 176 is caused to be an opposing 25 volts so that it bucks out the 25 volt polarizing source or battery 170 thereby putting terminals 167 and 172 at the same potential.

Control is always in the same direction, in that whenever there is an error, the phase of the controlled oscillator is decreased. The wave form 60*a* in FIGURE 5 illustrates this, when in going from five to eight units, the output signal arrived thereby decreasing to zero, starting over at the maximum of nine units and decreasing to eight. The method for obtaining this uni-directional control will now be considered, with respect to the present circuit.

With the comparator circuit activated as above, the transistor 140 goes from a nonconducting to a fully conducting stage or "bottoms" when the difference between the input ($E_{in}$) and output ($E_o$) voltages exceeds the predetermined limit such as that above mentioned of ½ volt, thereby causing a current to flow in the collector 145. This current flows through the capacitor 92 of the controlled oscillator 10, thereby supplementing the charge on the capacitor 92 which is normally charged through the resistors 95 and 79. The current from the transistor 140 is of a magnitude to cause the period of oscillation of the controlled oscillator 10 to be decreased by a unit incremental amount, such as to $^{10}/_{11}$ of its former value, if the current is present for most of one cycle. The collector resistors 162–163 control the current value and being then effectively in shunt relation to the timing or current control resistor 95, cause the frequency of the controlled oscillator 10 to increase. The threshold voltage, which slightly exceeds ½ volt, is determined in part by the voltage divider 152–153 and in part by the threshold voltages of the transistor 140 and the diodes in the bridge circuit.

The bridge circuit of four diodes causes the magnitude of the difference between the input and output voltages at the input terminals 135–137 to appear at the output terminals 148 and 149 and thus between the emitter 146 and the voltage divider tap or intermediate terminal 151. This voltage is derived with reference to the residual voltage indicated between the terminals 151 and 174 of the voltage divider. This property of the bridge 141 to present at its output terminals the magnitude of the difference between the absolute values of the voltages at the input terminals regardless of the polarities involved is important, because the transistor 140 is arranged to conduct when the difference of the input and output voltages exceeds the threshold voltage, regardless of which one is more positive.

It is desired that the transistor 140 should go from its nonconducting to fully conducting state just as the differences between the input and output voltage exceeds the threshold voltage. This is in order that the control current from the comparator circuit (transistor collector current) be either zero or some constant value and no other. This prevents changes of phase of greater than one per reference oscillator cycle or less. In short, the transistor 140 acts as a switch which is either "on" or "off." Some range of voltages will exist where the transistor 140 conducts partially, but to have accurate control this range should be small.

It is also desirable that when the difference between the input and output voltages is large the transistor 140 should conduct within reasonable current limits and substantially no stronger than when the threshold is just exceeded, that is, the output or control current through the circuit connection 138, which is the collector current, should be substantially constant and also the emitter current should be constant so that there may not be excessive loading of the input and output voltage sources.

To this end the current limiting resistor 165 may have a value of several megohms, such as 8.2 megohms in the present example, and provides a bias current which is sufficient to cause the transistor 140 to "bottom" or fully conduct when the emitter 146 becomes slightly more negative than −12 volts. This occurs when the input and output voltages differ by more than the limit, such as ½ volt as referred to. When the emitter is positive with respect to −12 volts, as when the output voltage is at the closest level to the input voltage, the diode 142 in the base circuit conducts the bias current and the transistor does not conduct. The diode and bias resistor connections with the base circuit of the transistor 140 keep the emitter current at a relatively constant value, regardless of the magnitude of the difference between the input and output voltages, by allowing the base to follow the emitter for emitter voltages more negative than −12 volts.

As is understood, the controlled oscillator operates with regenerative feedback through the transformer 71, and the output pulses are derived from the tertiary winding 121 for the phase detector operation. The RC time-constant network for the oscillator circuit comprises the resistor 95 and the capacitor 92. This network is connected with the capacitor between the base and the emitter, and with the isolating diode 67 between the terminal 96 and the base 68.

When the capacitor 92 is in a discharged condition the regenerative action begins and the transistor 65 begins to conduct and continues to conduct until the capacitor charges sufficiently to reduce the bias between the emitter and base and render the transistor nonconductive. Oscillation is thus sustained for a period of time determined by the circuit constants. The regenerative action, and thus oscillation, commences again when the capacitor 92 discharges through the resistor 95. The cycle then repeats. The pulses of voltage at the collector is thus provided at predetermined intervals and may be derived from the output winding 121.

In practice, the comparator is activated only when it is desired to effect control. Rendering the comparator inactive during noncontrol periods is desirable because the input signal is at the desired level only during the control period, following which it may return to some equilibrium level until a new control signal is transmitted to the voltage memory. The output voltage would follow the input voltage to the equilibrium level if the comparator were active and the source 131 were connected with the input terminals as shown, and is generally the case when the source may, for example, be a signal rectifier output circuit, in a remote control system. An electrical switch means however may be used in series with $E_{in}$ to obtain activation if desired, as an alternative to the activating control of the comparator.

It may be noted that the diodes used in the comparator circuit may all be of one type having the commercial designation T9G in the present example. The collector circuit resistors 162 and 163 may provide relatively high resistance for current limiting purposes and in the present example may be considered to have values respectively of 1 megohm and 2½ megohms. The voltage divider resistors 152 and 153 may have values respectively of 100K ohms and 270 ohms.

Summarizing the foregoing, it will be seen that the controlled blocking oscillator 10 is locked to a synchronizing signal or pulse from the high-frequency blocking oscillator 16, the controlled oscillator frequency being a submultiple of the synchronizing signal frequency and relatively widely separated therefrom to provide a wide range of level setting or a high frequency division ratio, substantially as referred to in the description of the wave forms of FIGURE 3A. The phase locking is determined by the input voltage or control signal, $E_{in}$. The phase detector provides the D.-C. output voltage or signal output, $E_o$, proportional to the phase difference between the controlled oscillator pulses and the reference oscillator pulses. The controlled oscillator may be synchronized to any of the high frequency pulses by successively varying the input voltage with respect to the output voltage above or below predetermined threshold value, and the output voltage will have as many steps or levels as there are states of operation for the controlled oscillator. Thus these depend upon the number of states or conditions of operation of the memory portion of the system.

During the control periods, the output voltage from the phase detector is fed back and compared to the input voltage in the comparator circuit, which provides an output control current or signal until the output voltage $E_o$ is at a correct level and within the threshold value with respect to the output voltage $E_o$. The comparator output current or signal is applied to the controlled oscillator and causes the phase difference to change until the output voltage $E_o$ is at the discrete level closest to the input voltage. When the comparator is not activated, there is no comparator output signal or current at the circuit 138, and the phase difference and the output voltage $E_o$ do not change.

From the foregoing description it will be seen that the voltage and phase memory system of the present invention effectively utilizes frequency division of pulse type signals to give many stable phase states. The use of a phase memory to provide a voltage memory is basically provided in this system and this is not restricted to the use of a comparator. Basically, a phase difference control means, a phase memory means, and a phase detector are combined in the system as a phase memory which operates to provide an effective voltage memory.

A further feature of the system is the use of feedback control which permits the phase difference to be controlled in accordance with an input voltage. In the comparator, the diode bridge circuit is an effective element which determines whether there is an error between the input voltage and the output voltage exceeding a certain magnitude, and without reference to the polarity, which causes the output voltage to change always in the same direction, and decreasing, until the error is eliminated or reduced to the lowest state, at which time the voltage rapidly increases to its other extreme and continues changing until substantially zero error occurs between the input and output voltages as described, particularly with reference to FIGURES 4, 5 and 6.

It may also be noted that the transistor element 140 of the comparator, plus the diode 142 and biasing circuits, provide switch means which is either fully on or fully off, so that the phase of the controlled oscillator changes at a constant rate or not at all, with respect to the phase of the reference oscillator 17. The specific circuitry of the comparator provides a diode bridge which presents at its output terminals the magnitude of its input voltage, and a transistor circuit which is either fully on or fully off for providing a control current to the timing circuit of the controlled oscillator.

Summarizing the foregoing, a high-frequency source of pulse-type signals plus a frequency divider provides a phase memory with many stable states that, in turn, effectively provides a voltage memory which is adapted for many uses including that for remote control systems.

Figure 8:
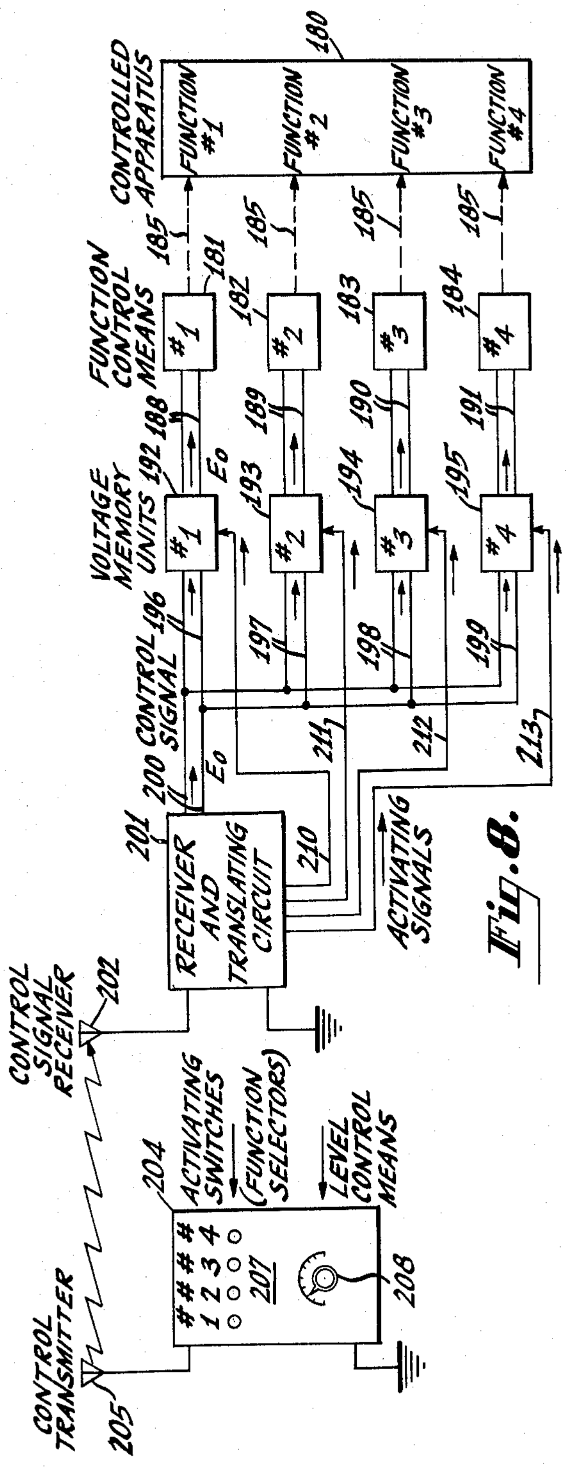

As mentioned hereinbefore, a voltage memory system as shown and described, is adapted for many uses such for example, as in connection with remote control circuits. An adaptation to this type of circuit in accordance with the invention is shown in FIGURE 8, to which attention is now directed. In the remote-control system shown, four control functions have been taken as a representative number in the controlled apparatus or equipment indicated by the block 180. A greater or lesser number of functions may be provided, depending upon the requirements of the particular equipment. Each function has suitable control means here represented by the blocks 181, 182, 183 and 184, which may be operatively connected with the apparatus 180 electrically or mechanically as indicated by the dotted arrowed lines 185. These represent any suitable operational connections, normally electrical, between the function control means and the portion of the apparatus which actively provides the control function.

The function control means 181–184 may be considered to be of the type which are responsive to different control voltages or voltage levels, applied to the respective input or control circuits 188, 189, 190 and 191. Thus they may be connected with respective voltage memory units 192, 193, 194 and 195, as shown, each of which may be constructed in accordance with the circuitry of FIGURE 7, to provide output voltages ($E_o$) in response to applied control signal or input voltages ($E_{in}$) at their responsive input circuits indicated at 196, 197, 198 and 199.

While these input circuits may be individually excited, they are connected in the present example, in parallel relation to a signal output or supply circuit 200 connected with suitable receiving and translating circuits represented by the block 201 for the control signal receiver of the remote control system. The receiver is provided with antenna means 202 for receiving control signals from a distant remote-control transmitter 204 having a similar transmitting antenna 205. The transmitter provides, for transmitting four activating signals for the four functions, controlled individually by activating switches indicated by control buttons or like elements 207, and for transmitting a level modulation to the control signal receiver in response to operation of a level control means having an operating element or knob 208.

The receiver circuits 201 are adapted to receive and translate the transmitted signals into a control signal at the output circuit 200, and any one of four activating signals which are delivered to the respective memory units 192–195 through signal circuit connections 210, 211, 212 and 213 for the four memory units. These connections correspond to those indicated by the dotted arrow lines in FIGURE 1 at 180 and 181, and as provided in connection with the activating signal input terminals 167–168 in the circuit of FIGURE 7.

In this system the level control 208 is rotated manually to provide for increasing or decreasing or "up" or "down" operation of the controlled apparatus 180 at the remote point, the particular function which is actuated or controlled in level depending upon which of the activating switches 207 have been operated prior to activate a selected one of the memory units 192–195. Thus in response to an applied control signal $E_{in}$ to the voltage memory units, only one of the units responds to translate the signal and change the voltage output $E_o$ to a new level, this being the one which has been activated by selection at the control transmitter by operation of one of the activating switches 207. Other forms of remote control circuitry may provide for selectively supplying the control signal to each of the voltage memory units as in FIGURE 1 for example. The present system is shown only by way of example as representing one of many uses for the voltage memory system of the present invention. Such a system may be used wherever a controlled quantized voltage output may be acceptable or desirable.

It will be seen from the foregoing description that the frequency-division voltage memory system of the present invention provides improved and simplified voltage memory units having many stable operating states and utilizing conventional devices, employs relatively economical circuitry, and yields a relatively large number of stable voltage levels for a relatively small number of active and nonlinear signal and translating devices.

Having described the invention, what is claimed is:

1. A memory system comprising a controlled oscillator, a synchronizing signal source coupled to said controlled oscillator, the frequency of said synchronizing source being the multiple of the frequency of said controlled oscillator frequency, means for comparing the phase of a signal from said controlled oscillator with the phase of a reference signal bearing a fixed phase relation to the signal from said synchronizing signal source to derive an output signal, and means coupled with said controlled oscillator and with said phase comparing means for changing the phase of said controlled oscillator to change the magnitude of said output signal.

2. A voltage memory system comprising in combination, phase-locked blocking oscillator means connected to provide frequency division of pulse type signals with a plurality of stable phase difference states, means for applying an input control voltage to said system to control the phase difference of the frequency division in accordance with the magnitude thereof, whereby the stored voltage information is a phase difference, and means for deriving therefrom an output voltage which corresponds to the phase difference of the memory, said last named means including a comparator circuit comprising a diode bridge having input and output voltage terminals, and having a differential control circuit connection with said phase memory to effect phase difference control in accordance with the input voltage magnitude.

3. A frequency-division voltage-memory system comprising in combination, a blocking oscillator for producing pulse output signals at predetermined frequencies which are submultiples of applied high frequency synchronizing pulse signals, a second blocking oscillator phase-lock to said high-frequency pulse signals to provide a phase-reference pulse signal output, a phase detector having pulse signal input circuits connected with said first and second named oscillators to provide an output voltage proportional to the difference in phase between the pulse signal output of said oscillators, means providing a current responsive timing circuit in said first named oscillator, an amplifier connected with said timing circuit to apply a variable timing control current thereto, a voltage comparator circuit having a diode bridge network therein connected in said amplifier circuit to control said current, means for deriving said output voltage from the phase detector for application to said bridge network, and means for applying an input control signal voltage to said network in opposition to the applied phase detector voltage for comparison and differential control of said amplifier and said timing control current to effect variation of the phase differential between the pulse output signals from said oscillators and the magnitude of the output voltage.

4. A frequency-division voltage memory system comprising in combination, means providing high-frequency synchronizing signal pulses at a fixed frequency, phase-reference blocking oscillator means connected with said high-frequency pulse source and phase-locked thereto to provide phase-reference pulse signals at a sub-multiple frequency, and a voltage-memory unit having control voltage input terminals and output voltage terminals, said voltage memory unit including an astable controlled blocking oscillator operative at said submultiple frequency and phase locked to said source of high-frequency pulses, a phase detector having a voltage output circuit connected to said output terminals and having two pulse signal input circuits, one of said last-named input circuits being coupled to said phase-reference oscillator for receiving said phase-reference pulses therefrom at a fixed phase, the other of said pulse signal input circuits being coupled to said controlled blocking oscillator for receiving the pulse signal output therefrom at an adjustable phase, said phase detector being operative to provide an output voltage at said output terminals proportional to the difference in phase between said pulse signals, and a voltage comparator circuit having a signal input connection with said input terminals and having a control signal output connection with said controlled blocking oscillator, means connected with said output terminals for applying the output voltage therefrom to said comparator circuit for comparison with the input voltage at said input terminals, and said comparator providing an output control signal through said output connection for causing the phase of the controlled blocking oscillator to change when the output voltage is at a discrete level separated from the input voltage by a predetermined voltage differential in response to the phase detector output voltage, thereby to utilize a phase memory with frequency division of pulse type signals to provide a voltage memory, wherein the output voltage corresponds to the phase difference of the memory.

5. A frequency division voltage memory system as defined in claim 4, wherein the comparator circuit includes a diode bridge having input terminals connected with said input and output terminals for the system and having bridge output terminals, a transistor amplifier for applying a phase controlling current to said controlled blocking oscillator connected with said bridge circuit output terminals whereby the comparator circuit responds to the magnitude of the difference between the input and output voltages at said bridge output terminals above a predetermined threshold voltage in controlling the phase of the controlled oscillator.

6. A frequency-division voltage memory system comprising in combination, means providing high-frequency synchronizing pulses, oscillator means connected with said high-frequency pulse source and phase locked thereto to provide phase-reference pulse signals at a submultiple frequency, and a voltage memory unit including a controlled blocking oscillator of the same submultiple frequency as the phase-reference oscillator and phase locked to said source of high-frequency pulses, means providing a current-controlled timing circuit in said controlled oscillator for changing the phase thereof, a phase detector having a voltage output circuit and having a first signal input circuit coupled to said phase-reference oscillator for receiving pulse signals therefrom at a fixed phase and a second signal input circuit coupled to said controlled blocking oscillator for receiving the pulse signal output therefrom, said phase detector being operative to provide an output voltage at said output circuit proportional to the difference in phase between the controlled oscillator pulse signals and the phase-reference pulse signals, and a voltage comparator circuit including means for applying the output voltage from the phase detector output circuit and an input control voltage to vary the control current to said timing circuit and the phase of said controlled oscillator with respect to the phase reference pulses, and thereby to change the output voltage to a discrete elevel separated from the input voltage by a predetermined differential.

7. A frequency-division voltage memory system comprising in combination, means providing high-frequency synchronizing pulses at a fixed frequency, phase-reference blocking oscillator means connected with said high-frequency pulse source and phase-locked thereto to provide phase-reference pulse signals at a submultiple frequency, and a voltage memory unit including a controlled blocking oscillator phase locked to said source of high-frequency pulses, means providing a resistance-capacitance timing circuit in said controlled oscillator for changing the phase thereof, a phase detector having a voltage output circuit and having a pulse signal input circuit coupled to said phase-reference oscillator for receiving phase-reference pulse signals therefrom at a fixed phase and a second pulse signal input circuit coupled to said controlled blocking oscillator for receiving the pulse signal output therefrom at an adjustable phase, said phase detector being operative to provide an output voltage at said output circuit proportional to the difference in phase between the controlled oscillator pulse signals and the phase-reference pulse signals, and a voltage comparator circuit including a diode bridge network having input and output terminals and a transistor amplifier having an emitter circuit and a collector circuit, said emitter circuit being connected with said output terminals for said bridge network and said collector circuit being connected with said timing circuit to control the controlled oscillator phase, means for applying the output voltage from the phase detector and an input control voltage to the input terminals of said bridge network for comparison thereby to vary the control current to said timing circuit and the phase of said controlled oscillator with respect to the phase reference pulses, and thereby to change the output voltage to a discrete level separated from the input voltage by a predetermined differential.

8. A memory system comprising:

a controlled oscillator;

a synchronizing signal source coupled to said controlled oscillator, the frequency of said synchronizing source being higher than the frequency of said controlled oscillator frequency;

means for comparing the phase of a signal from said controlled oscillator with the phase of a reference signal bearing a fixed phase relationship to the signal from said synchronizing signal source to derive an output signal, and means coupled with said controlled oscillator and with said phase comparing means for changing the phase of said controlled oscillator to change the magnitude of said output signal.

References Cited by the Examiner

UNITED STATES PATENTS

| | | | |
|---|---|---|---|
| 2,536,816 | 1/51 | Krumhansl et al. | 331—51 X |
| 2,740,047 | 3/56 | Bayliss | 328—40 X |
| 2,808,509 | 10/57 | Felch et al. | 331—2 |
| 2,815,488 | 12/57 | Von Newman | 332—52 |
| 2,939,081 | 5/60 | Dennis | 235—92 |
| 3,011,706 | 12/61 | Goto | 328—92 |

JOHN W. HUCKERT, *Primary Examiner.*

HERMAN K. SAALBACH, ARTHUR GAUSS, *Examiners.*

UNITED STATES PATENT OFFICE

CERTIFICATE OF CORRECTION

Patent No. 3,193,770

July 6, 1965

Thomas G. Marshall, Jr.

It is hereby certified that error appears in the above numbered patent requiring correction and that the said Letters Patent should read as corrected below.

Column 7, line 38, for "of" read -- if --; column 16, line 3, for "circuit" read -- current --.

Signed and sealed this 18th day of January 1966.

(SEAL)
Attest:

ERNEST W. SWIDER
Attesting Officer

EDWARD J. BRENNER
Commissioner of Patents